(12) United States Patent
Zhao et al.

(10) Patent No.: US 11,821,729 B2
(45) Date of Patent: Nov. 21, 2023

(54) ELMAN NEURAL NETWORK ASSISTING TIGHT-INTEGRATED NAVIGATION METHOD WITHOUT GNSS SIGNALS

(71) Applicant: Harbin Engineering University, Heilongjiang (CN)

(72) Inventors: Lin Zhao, Heilongjiang (CN); Zihang Peng, Heilongjiang (CN); Jicheng Ding, Heilongjiang (CN); Kun Wang, Heilongjiang (CN); Yaguo Bai, Heilongjiang (CN); Yongchao Zhang, Heilongjiang (CN); Renlong Wang, Heilongjiang (CN)

(73) Assignee: Harbin Engineering University, Harbin (CN)

( * ) Notice: Subject to any disclaimer, the term of this patent is extended or adjusted under 35 U.S.C. 154(b) by 383 days.

(21) Appl. No.: 17/013,750

(22) Filed: Sep. 7, 2020

(65) Prior Publication Data
US 2021/0095965 A1 Apr. 1, 2021

(30) Foreign Application Priority Data
Sep. 26, 2019 (CN) .......................... 201910915008.3

(51) Int. Cl.
*G01C 21/16* (2006.01)
*G01S 19/47* (2010.01)
*G06N 3/084* (2023.01)
*G06N 5/046* (2023.01)

(52) U.S. Cl.
CPC ......... *G01C 21/188* (2020.08); *G01C 21/165* (2013.01); *G01S 19/47* (2013.01); *G06N 3/084* (2013.01); *G06N 5/046* (2013.01)

(58) Field of Classification Search
CPC .................................................... G01C 21/188
See application file for complete search history.

(56) References Cited

U.S. PATENT DOCUMENTS

2018/0348250 A1* 12/2018 Higgins ................. G01C 23/00

* cited by examiner

*Primary Examiner* — Hyun D Park
(74) *Attorney, Agent, or Firm* — Dragon Sun Law Firm, PC; Nathaniel Perkins

(57) ABSTRACT

A tight-integrated navigation method assisted by Elman neural network when GNSS signals are blocked based on the tight-integrated navigation system model of the INS and GNSS, where the dynamic Elman neural network prediction model is used to train the inertial navigation error model and the GNSS compensation model, so as to solve the problem of tight-integrated navigation when the GNSS signals are blocked. When the GNSS signals are blocked, the trained neural network is used to predict the output error of GNSS and compensate the output of inertial navigation, so that the error will not diverge sharply, and the system can continue to work in the integrated navigation mode. The low-cost tight-integrated navigation module is used, and the collected information is preprocessed to form the sample data for training the neural network to train the Elman neural network model.

6 Claims, 10 Drawing Sheets

ELMAN NEURAL NETWORK ASSISTING TIGHT-INTEGRATED NAVIGATION METHOD WITHOUT GNSS SIGNALS

CROSS-REFERENCE TO RELATED PATENT APPLICATION

This application claims priority to and the benefit of 201910915008.3, filed Sep. 26, 2019. The entire disclosure of the above-identified application is incorporated herein by reference.

FIELD

This disclosure relates to a tight-integrated navigation method, and more specifically, to a tight-integrated navigation method assisted by an Elman neural network when GNSS signals are blocked.

BACKGROUND

The inertial navigation system can provide navigation information comprehensively and autonomously, and the errors of the inertial navigation system will be accumulated gradually when the inertial navigation system is low-cost. Although GNSS has a wide positioning range and a high accuracy, the GNSS signals are easy to be blocked and interfered. Therefore, the inertial navigation and GNSS can be complemented with each other, and the tight integration of inertial navigation and GNSS can make full use of these two systems. The tight integration can also improve the accuracy and reliability of the navigation system. However, for the tight-integrated navigation system, when satellite signals are unavailable for a short period of time due to the blocking or interference, the tight-integrated navigation system works in inertial navigation mode only, and at this time the navigation accuracy depends on the accuracy of the inertial navigation device or the accuracy of the tight-integrated navigation at the previous moment when the GNSS is unavailable. Since the errors of the low-cost inertial navigation systems are accumulated gradually and cannot be corrected, the navigation accuracy will be decreased rapidly, and even that the navigation system will not be used.

The reason, why the accuracy of the tight-integrated navigation system is decreased rapidly without the GNSS signals, is that the prior inertial navigation error model is difficult to satisfy the actual situation in lack of external observations. If an accurate inertial navigation error model is obtained at the current time, even when the GNSS signals are blocked, this accurate error model can also be used to calculate the error of the inertial navigation system, and finally the error of the inertial navigation can be compensated. Neural networks have good nonlinear mapping capabilities and can simulate the input and output of actual models. Traditional neural networks, such as BP neural network, multilayer perceptron neural network, radial basis function neural network and the like, can be used to derive the inertial navigation error model, but these neural networks are static networks, and are not easy to accurately describe the dynamic characteristics of nonlinear systems.

SUMMARY

Embodiments of the present disclosure provide a tight-integrated navigation method assisted by an Elman neural network when GNSS signals are blocked, which can accurately describe the dynamic characteristics of nonlinear systems. The Elman neural network is a typical multilayer dynamic recurrent neural network, which can predict the inertial navigation error signal when the GNSS signals are temporarily blocked, and compensate and correct the output of the inertial navigation by the predicted data, so that the integrated navigation system can continue to provide navigation data when the GNSS signals are momentarily unavailable.

An Elman neural network assisting tight-integrated navigation method without GNSS signals, comprising:

Step 1: establishing an Elman neural network model and selecting a hidden layer transfer function of the Elman neural network, Step 2: designing an Elman learning algorithm, Step 3: establishing a tight-integrated Kalman filter mathematical model, Step 4: when the GNSS signals are available, the neural network works in a training mode, a three-dimensional position information output by an inertial navigation system is used as input samples for training the neural network designed in the step 2; a compensation value of an inertial navigation error output after a fusion of the Kalman filter established in step 3 is used as expected output samples for training the network, and the input samples and the expected output samples are brought into the Elman neural network established in the step 2 for training the Elman neural network; when errors between actual outputs of the Elman neural network and the expected output samples are more than a predetermined threshold, an updated value of a network weight is obtained by cyclically using the Elman neural network algorithm designed in step 2 until the errors between the actual outputs of the network and the expected outputs are less than the predetermined threshold, and Step 5: when the GNSS signals are blocked, the neural network works in a prediction mode; a navigation position information output by the inertial navigation system is used as the input of the network trained by the step 4, an error of the inertial navigation system is predicted by the neural network model trained by the step 4, and a corrected navigation information is obtained by correcting the navigation output of the inertial navigation system by the error predicted by the neural network model.

The present disclosure further comprising,

The Elman neural network comprises an input layer, a hidden layer, a connection layer and an output layer, the mathematical model of the Elman neural network is expressed as follows:

$$xh(k)=f(W1P(k)+W3x(k));$$

$$xc(k)=\alpha xh(k-1);$$

$$y(k)=g(W2x(k));$$

Wherein, $P(k)$ represents an input vector of the Elman neural network at time k, $xh(k)$ represents an output vector of the hidden layer neuron at time k, $x(k)$ represents an input vector of the Elman neural network derived from the output of the hidden layer at time k, $xc(k)$ represents an output vector of the connection layer at time k, $y(k)$ represents the output vector of the entire network output layer at time k, $W1$, $W2$ and $W3$ are respectively connection weight matrixes between the input layer and the hidden layer, between the hidden layer and the output layer, and between the connection layer and the hidden layer, $f(\bullet)$ and $g(\bullet)$ are respectively transfer functions of the hidden layer and the output layer, and α is a connection feedback gain factor.

An S-tangent function is selected as the transfer function of the hidden layer of Elman neural network.

The step 2 comprises,

A calculation process of the Elman neural network is divided to comprise a forward propagation of a working signal and a backward propagation of the error; the calculation of the forward propagation of the working signal is in consistent with the mathematical model of the Elman neural network, and the signal y(k) of the network output is calculated;

The back propagation of the error is as follows: that the actual output of the network is y(k) at time k is assumed, and the expected output response of the network is yd(k), then the error of the network is as follows:

$$E_k = \frac{1}{2}(y_d(k))^2$$

Partial derivatives of the error function with respect to the connection weights between different layers are obtained, respectively; the partial derivative of the error function Ek with respect to the connection weight matrix W2 from the hidden layer to the output layer is obtained as follows:

$$\frac{\partial E}{\partial w_{ij}^2} = -(y_{d,i}(k) - y(k))\frac{\partial y_i(k)}{\partial w_{ij}^2} = -(y_{d,i}(k) - y(k))g(\bullet)x_j(k)$$

Wherein, i represents an i-th hidden layer neuron, which is the i-th row of the weight matrix W2, and j represents a j-th output layer neuron, which is the j-th column of the weight matrix W2;

Assuming $\delta_i^0 = (y_{d,i}(k) - y(k))g(\bullet)$, then:

$$\frac{\partial E}{\partial w_{ij}^2} = -\delta_i^0 x_j(k)$$

The partial derivative of Ek with respect to the connection weight matrix W1 from the input layer to the hidden layer is obtained as follows:

$$\frac{\partial E}{\partial w_{ij}^1} = \frac{\partial E}{\partial x_j(k)}\frac{\partial x_j(k)}{\partial w_{ij}^1} = \sum\left(-\delta_i^0 w_{ij}^2\right)f_j'(\bullet)P(k-1)$$

Assuming $$\delta_j^h = \sum_{i=1}^m \left(-\delta_i^0 w_{ij}^2\right)f_j'(\bullet),$$

then:

$$\frac{\partial E}{\partial w_{ij}^1} = -\delta_j^h P(k-1)$$

The partial derivative of Ek with respect to the connection weight matrix W3 from the connection layer to the hidden layer is obtained as follows:

$$\frac{\partial E}{\partial w_{ij}^3} = \sum\left(-\delta_i^0 w_{ij}^2\right)\frac{\partial x_j(k)}{\partial w_{ij}^3} = f_j' x_{c,l}(k) = f_j'(\bullet)x_i(k-1) + \alpha f_i'(\bullet)x_{c,l}(k)$$

Wherein, l is the l-th neuron of the connection layer;

Using $$\Delta w = -\frac{\partial E}{\partial w},$$

updated values for each weight may be obtained as follows:

$$\Delta w_{ij}^2 = \eta \delta_i^0 x_j(k)$$

$$\Delta w_j^1 = \eta \delta_i P(k-1)$$

$$\Delta w_{ij}^3 = \eta \sum \left(\delta_i^0 w_{ij}^2\right)\frac{\partial x_j(k)}{\partial w_{jl}^3}\delta_i^0 x_j(k)$$

Wherein, $$\delta_i^0 = (y_{d,i}(k) - y(k))g_i(\bullet)$$

$$\delta_j^h = \Sigma(\delta_i^0 w_{ij}^2)f_j'(\bullet)$$

The step 3 comprises, 15-dimensional system state variables selected are as follows:

$$X = [\delta pos\, \delta V\, \delta \varphi\, \varepsilon\, \nabla\, b_{clk}\, d_{clk}]$$

Wherein, δpos is three position errors of the ECEF coordinate system, δV is a velocity error in the ENU coordinate system, δ$_\varphi$ is three posture errors of the inertial navigation system, ε is three posture angle errors, ∇ is acceleration zero-biases in three directions, $b_{clk}$ is a clock error, and $d_{clk}$ is a clock drift;

An external observation is obtained by the difference Z between the pseudo-range information and pseudo-range rate information obtained by the inertial navigation system and the measurement information of the pseudo-range and pseudo-range rate of each GNSS satellite, a system measurement equation is as follows:

$$Z = \begin{bmatrix} Z_\rho \\ Z_{\dot\rho} \end{bmatrix} = HX + V$$

Wherein, H is an observation matrix, V is an observation noise, ρ is a pseudo-range, and $\dot\rho$ is a pseudo-range rate;

A filtering calculation is performed by the EKF for the integrated navigation, the detailed filtering calculation is as follows:

one-step prediction status:

$$Xk, k-1 = \varphi k, k-1 Xk-1$$

A status estimation:

$$Xk = Xk, k-1 + Kk[Zk - hk(Xk, k-1)]$$

A one-step prediction error variance matrix:

$$P_{k,k-1} = \phi_{k,k-1} P_{k-1} \phi_{k,k-1}^T + Q_{k-1}$$

A filter gain matrix:

$$K_k = P_{k,k-1} H_k^T (H_K P_{k,k-1} H_k^T + R_K)^{-1}$$

An estimation error variance matrix:

$$Pk = (I - KkHk)Pk, k-1$$

Wherein, Φ is an error status transfer matrix, K is a Kalman gain matrix, P is an error covariance matrix, and R is a noise covariance matrix;

The corrected position information X in three directions is calculated by the aforementioned Kalman filter, and the difference between the positions before and after the correction is brought into the established Elman neural network as an output of neural network during the neural network training.

The step 4 comprises during network training, the number of input neurons and output neurons of the network is the number of position parameters in three directions in the ECEF coordinate system, m is 3; the number I of neurons in the hidden layer is 3; the input of the network is the position informations $\hat{x}_k$ output by the inertial navigation of the integrated navigation system, the target output of the network is the compensation inertial navigation position $\Delta E$ after filtering of the integrated system; the input samples and output samples are brought into the y(k) and yd (k) of the Elman neural network established in the step 2 to train the neural network, and the output $\bar{x}_k$ corrected by neural network is obtained after the training is completed, Wherein, $\Delta E = \bar{X}_k - \hat{X}_k$ The data of $\Delta E$ are saved in the Elman neural network model, and the error of the inertial navigation is corrected by retrieving the error data $\Delta E$ at the corresponding sampling time;

The position $\bar{x}_k$ in the three directions in the ECEF coordinate system is compensated in order to make a prediction, $$\bar{X}_k = \hat{X}_k + \Delta E$$

The status prediction estimation in the integrated navigation is corrected in real time according to the trained network, and when correcting, the status variable $\hat{X}_k$ of the EKF filter of the integrated system is replaced by the $\bar{x}_K$.

The advantages of the aspects of embodiments of the present disclosure lie in that: the Elman neural network is a typical multilayer dynamic recurrent neural network, which can predict the inertial navigation error signal when the GNSS signals are temporarily blocked, and compensate and correct the output of the inertial navigation by the predicted data, so that the integrated navigation system can continue to provide navigation data when the GNSS signals are momentarily unavailable.

The dynamic Elman neural network prediction model is used to train the inertial navigation error model and the GNSS compensation model, so as to solve the problem of tight-integrated navigation when the GNSS signals are blocked. When the GNSS signals are blocked, the trained neural network is used to predict the output error of GNSS and compensate the output of inertial navigation, so that the error will not diverge sharply, and the system can continue to work in the integrated navigation mode. The low-cost tight-integrated navigation module is used, and the collected information is preprocessed to form the sample data for training the neural network to train the Elman neural network model. In the present disclosure, the output error of GNSS can be predicted when the GNSS signals are blocked for 100 s, so that the navigation system can still work in tight-integrated navigation mode.

An Elman neural network assisting tight-integrated navigation system, comprising: a GNSS receiver for receiving GNSS signals, an INS receiver for receiving INS signals, a Kalman filter for executing a filtering process of received signals, and a processor operable to establish an Elman neural network model and selecting a hidden layer transfer function of the Elman neural network, design an Elman learning algorithm, and establish a tight-integrated Kalman filter mathematical model, wherein, when the GNSS signals are available, the Elman neural network works in a training mode, a three-dimensional position information outputted by the INS receiver is used as input samples for training the Elman neural network designed by the processor; a compensation value of an inertial navigation error output after a fusion of the Kalman filter is used as expected output samples for training the Elman neural network, and the input samples and the expected output samples are brought into the Elman neural network established for training the Elman neural network; when errors between actual outputs of the Elman neural network and the expected output samples are more than a predetermined threshold, an updated value of a network weight is obtained by cyclically using the Elman neural network until the errors between the actual outputs of the Elman neural and the expected outputs are less than the predetermined threshold, and when the GNSS signals are blocked, the Elman neural network works in a prediction mode; a navigation position information output by the INS receiver is used as the input of the trained neural network, an error of the inertial navigation system is predicted by the trained neural network, and a corrected navigation information is obtained by correcting the navigation output of the INS receiver by the error predicted by the Elman neural network.

DETAILED DESCRIPTION

The specific embodiments of the present disclosure will be further described below with reference to the drawings.

In order that the integrated navigation system can continue to provide navigation data when the GNSS signals are momentarily unavailable, the present disclosure provides a tight-integrated method assisted by an Elman neural network when GNSS signals are blocked. The Elman neural network model is established by using appropriate hidden layer function. The tight-integrated navigational system may continue to work in the tight-integrated navigational mode by using the Elman neural network model when the GNSS signals are blocked.

The specific steps are as follows:

Step 1: Establishing an Elman neural network model and selecting a hidden layer transfer function of the Elman neural network.

Step 2: Designing an Elman learning algorithm.

Step 3: Establishing a tight-integrated Kalman filter mathematical model.

Step 4: Bringing the input and output of the tight-integrated Kalman filter mathematical model established in Step 3 into the Elman learning algorithm designed in Step 2 to train the Elman neural network model. After the training is completed, the inertial navigation position information is input to the neural network when the GNSS signals are blocked, so as to complete the tight-integrated algorithm assisted by Elman neural network after obtaining the output of neural network.

Figure 1:
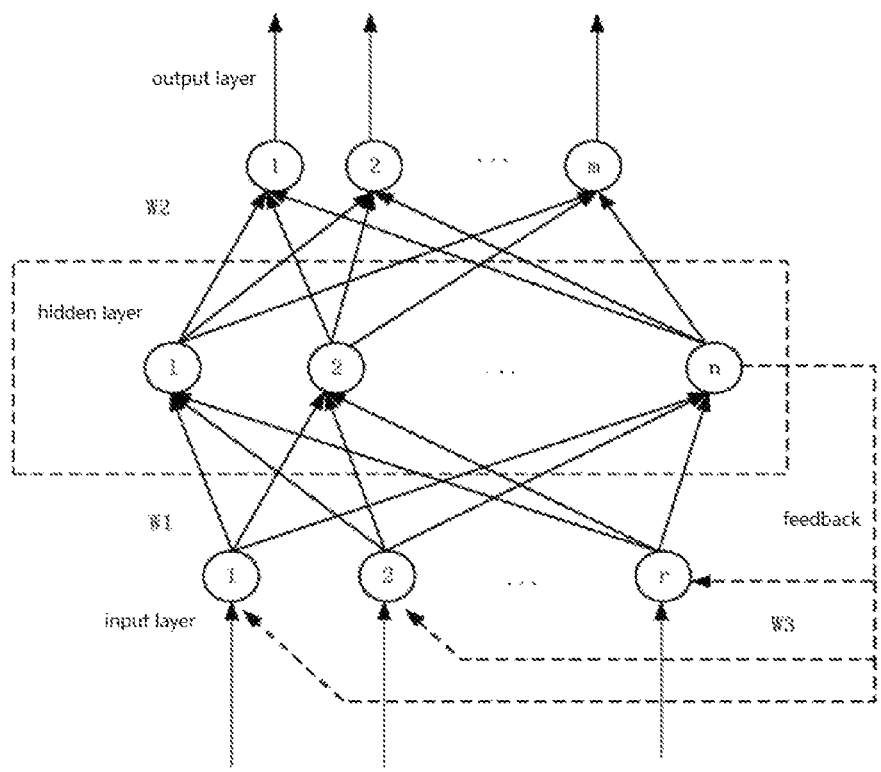
FIG. 1 is a topology diagram of an Elman neural network.

The details of Step 1 is as follows:

FIG. 1 shows an Elman neural network structure designed in the present disclosure. The Elman neural network is a feedback neural network, and mainly comprises an input layer, a hidden layer, a connection layer and an output layer. The connection layer is used to connect the output and input of the hidden layer, and memorizes and saves the output of the hidden layer at the previous time. The output of the hidden layer at the previous time is used as the input of the hidden layer at the current time with a new input, and the connection layer functions as a first-order delay operator. The network will be sensitive to historical data by the delay operator of the connection layer, and the capacity of processing dynamic information by the system is improved. The Elman neural network has dynamic memory capabilities because of the connection layer, so that the Elman neural network may be learned with respect to systems having time-varying characteristics.

The mathematical model of the Elman neural network can be expressed as follows:

$$xh(k)=f(W1P(k)+W3x(k)) \quad (1)$$

$$xc(k)=\alpha xh(k-1) \quad (2)$$

$$y(k)=g(W2x(k)) \quad (3)$$

The vector P(k) represents an input vector of the Elman neural network at time k, xh(k) represents an output vector of the hidden layer neuron at time k, x(k) represents an input vector of the Elman neural network derived from the output of the hidden layer at time k, $x_c(k)$ represents an output vector of the connection layer at time k, y(k) represents the output vector of the entire network output layer at time k, W1, W2 and W3 are respectively the connection weight matrix between the input layer and the hidden layer, between the hidden layer and the output layer, and between the connection layer and the hidden layer, f(•) and g(•) are the transfer functions of the hidden layer and the output layer respectively, and α is the connection feedback gain factor.

Figure 2:
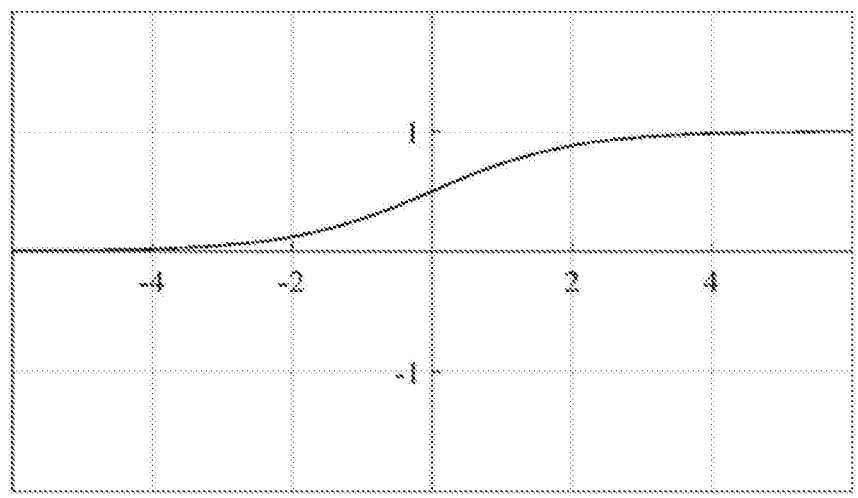
FIG. 2 is an S-type logarithmic function.
Figure 3:
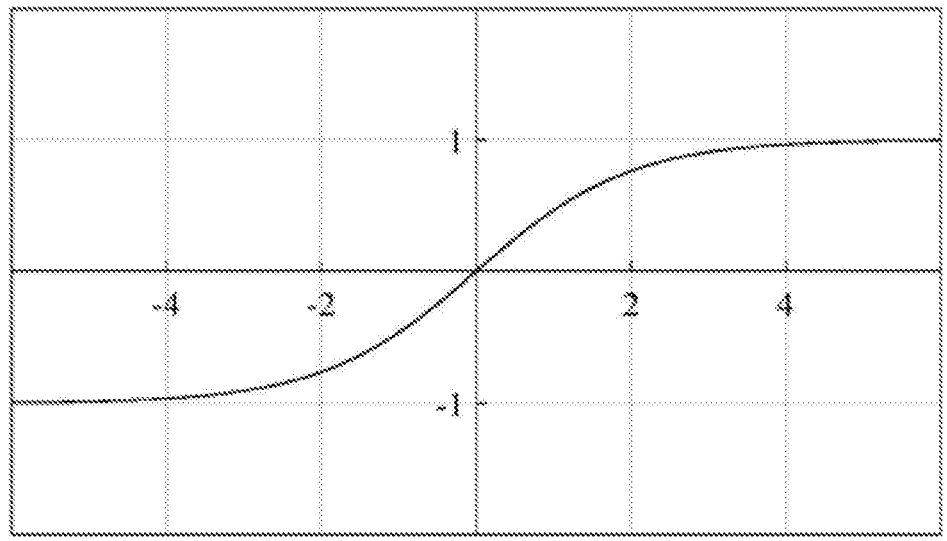
FIG. 3 is an S-type tangent function.
Figure 4:
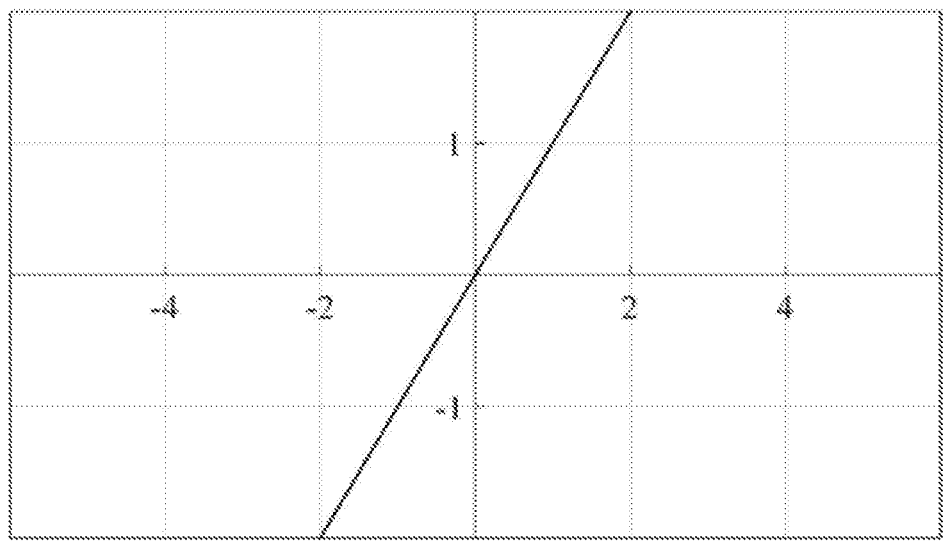
FIG. 4 is a linear function.

The transfer function is mainly used to limit the output of the neuron and keep the output value of the neuron within a predetermined range, and thus the transfer function may also be called as a squashing function. There are many types of transfer functions that can be used in neural networks, such as the S-type logarithmic functions, S-type tangent functions, and linear functions as shown in FIGS. 2 to 4. It can be found from the figures that the input values of the three transfer functions can be the values of any range, but the difference among three transfer functions is the different range of the output amplitude compression. Generally, the transfer function may be chosen according to the needs of the application. In the disclosure, the input of the neural network is a position coordinate information calculated by the inertial navigation, and the output is a position information compensated by the GNSS signals. Therefore, the input and output data may be positive or negative. After normalizing the original data, the coordinate components are distributed in the range of [−1, 1], so the output of the hidden layer neuron must also be in range of [−1, 1]. The S-tangent function may be selected as the transfer function of the hidden layer neuron in the disclosure.

The details of Step 2 are as follows:

The main calculation process of the Elman neural network is divided to comprise the forward propagation of the working signal and the backward propagation of the error. The calculation of the forward propagation of the working signal is in consistent with the mathematical model of the Elman neural network, and thus, the signal y(k) of the network output may be calculated. The back propagation of the error is specifically as follows: that the actual output of the network is y(k) at time k is assumed, and the expected output response of the network is yd(k), then the error of the network is as follows:

$$E_k=\tfrac{1}{2}(y_d(k)-y(k))^2 \quad (4)$$

The partial derivative of the error function with respect to the weight between different layers such as the hidden layer and the output layer is obtained, respectively, the partial derivative of the error function Ek with respect to the connection weight matrix W2 from the hidden layer to the output layer can be obtained as follows:

$$\frac{\partial E}{\partial w_{ij}^2} = -(y_{d,i}(k)-y(k))\frac{\partial y_i(k)}{\partial w_{ij}^2} = -(y_{d,i}(k)-y(k))g(\bullet)x_j(k) \quad (5)$$

wherein, i represents the i-th hidden layer neuron, which is the i-th row of the weight matrix W2, and j represents the j-th output layer neuron, which is the j-th column of the weight matrix W2.

Assuming $\delta_i^0=(y_{d,i}(k)-y(k))g(\bullet)$, then:

$$\frac{\partial E}{\partial w_{ij}^2} = -\delta_i^0 x_j(k); \quad (6)$$

The partial derivative of Ek with respect to the connection weight W1 from the input layer to the hidden layer can be obtained as follows:

$$\frac{\partial E}{\partial w_{ij}^1} = \frac{\partial E}{\partial x_j(k)}\frac{\partial x_j(k)}{\partial w_{ij}^1} = \sum(-\delta_i^0 w_{ij}^2)f_j'(\bullet)P(k-1) \quad (7)$$

Assuming $$\delta_j^h = \sum_{i=1}^{m}(-\delta_i^0 w_{ij}^2)f_j'(\bullet),$$

then:

$$\frac{\partial E}{\partial w_{ij}^1} = -\delta_i^h P(k-1) \quad (8)$$

Similarly, the partial derivative of Ek with respect to the connection weight W3 from the connection layer to the hidden layer can be obtained as follows:

$$\frac{\partial E}{\partial w_{ij}^3} = \sum(-\delta_i^0 w_{ij}^2)\frac{\partial x_j(k)}{\partial w_{ij}^3} = f_j' x_{c,l}(k) = f_j'(\bullet)x_i(k-1) + \alpha f_j'(\bullet)x_{c,l}(k) \quad (9)$$

The 1 is the 1-th neuron of the connection layer.
Using $$\Delta w = -\frac{\partial E}{\partial w},$$

the updated values for each weight may be obtained as follows:

$$\Delta w_{ij}^2 = \eta \delta_i^0 x_j(k) \quad (10)$$

$$\Delta w_j^1 = \eta \delta_i P(k-1) \quad (11)$$

$$\Delta w_{ij}^3 = \eta \sum (\delta_i^0 w_{ij}^2)\frac{\partial x_j(k)}{\partial w_{jl}^3}\delta_i^0 x_j(k) \quad (12)$$

Wherein, $$\delta_i^0 = (y_{d,i}(k) - y(k))g_i(\bullet) \quad (13)$$

$$\delta_j^h = \Sigma(\delta_i^0 w_{ij}^2)f_j'(\bullet) \quad (14)$$

The details of Step 3 are as follows:
The Elman network structure is established, and then the Kalman filter in the tight-integrated navigation of INS and GPS is established, so as to use the position information before and after filtering as the input and output of the neural network to train the neural network. The Kalman filter equation of the tight integration is established according to the error equations of INS and GPS in the tight integrated navigation. The 15-dimensional system state variables selected are as follows:

Wherein, δpos is the three position errors of the ECEF coordinate system, δV is the velocity error in the ENU (east north and up) coordinate system, δφ is the three posture errors of the inertial navigation system, c is the three posture angle errors, ∇ is the acceleration zero-bias in three directions, bclk is the clock error, and dclk is the clock drift.

An external observation is obtained by the difference Z between the pseudo-range information and pseudo-range rate information obtained by the inertial navigation system and the measurement information of the pseudo-range and pseudo-range rate of each GNSS satellite, the system measurement equation is as follows:

$$Z = \begin{bmatrix} Z_\rho \\ Z_{\dot\rho} \end{bmatrix} = HX + V \quad (16)$$

Wherein, H is the observation matrix, V is the observation noise, ρ is the pseudo-range, and ρ̇ is the pseudo-range rate.

The integrated navigation system of inertial navigation and GNSS is a nonlinear system. If the error is small, the inertial navigation posture error is generally obtained by the state equation of linear error. However, when the inertial equipment accuracy is poor or the inertial navigation system angle error is too large, non-linear factors in the navigation system cannot be ignored, and the inertial navigation posture error may be obtained by nonlinear filtering algorithm. The EKF (Extended Kalman Filter) is used to obtain the inertial navigation posture error.

The one-step prediction status:

$$Xk,k-1 = \varphi k,k-1 Xk-1 \quad (17)$$

The status estimation:

$$Xk = Xk,k-1 + Kk[Zk - hk(Xk,k-1)] \quad (18)$$

The one-step prediction error variance matrix:

$$P_{k,k-1} = \phi_{k,k-1} P_{k-1} \phi_{k,k-1}^T + Q_{k-1} \quad (19)$$

The filter gain matrix:

$$k_k = P_{k,k-1} H_k^T (H_k P_{k,k-1} H_k^T + R_K)^{-1} \quad (20)$$

Estimation error variance matrix:

$$Pk = (I - KkHK)Pk,k-1 \quad (21)$$

Wherein, Φ is an error status transfer matrix, K is a Kalman gain matrix, P is an error covariance matrix, and R is a noise covariance matrix.

The corrected position information X in the three directions is calculated by the aforementioned Kalman filter, and the difference between the positions before and after the correction is brought into the established Elman neural network as a output of neural network during the neural network training.

The details of Step 4 are as follows:
During network training, the number of input neurons and output neurons of the network is the number of position parameters in three directions in the ECEF coordinate system, that is, m is 3. The number I of neurons in the hidden layer is 3. The input of the network is the position information $\hat{x}_k$ output by the inertial navigation of the integrated navigation system. The target output of the network is the compensation inertial navigation position ΔE after the filtering of the integrated system. The input samples and output samples are brought into the y(k) and yd (k) of the Elman neural network established in the Step 2 to train the neural network, and the output $\bar{x}_k$ corrected by neural network is obtained after the training is completed.

Wherein, $$\Delta E = \bar{X}_k - \hat{X}_k \quad (22)$$

The data of ΔE are saved in the Elman neural network model, and thus, the error of the inertial navigation may be corrected by retrieving the error data ΔE at the corresponding sampling time.

The position $\bar{X}_k$ in the three directions in the ECEF coordinate system should be compensated in order to make a prediction, and thus:

$$\bar{X}_k \hat{X}_k + \Delta E \quad (23)$$

Figure 5:
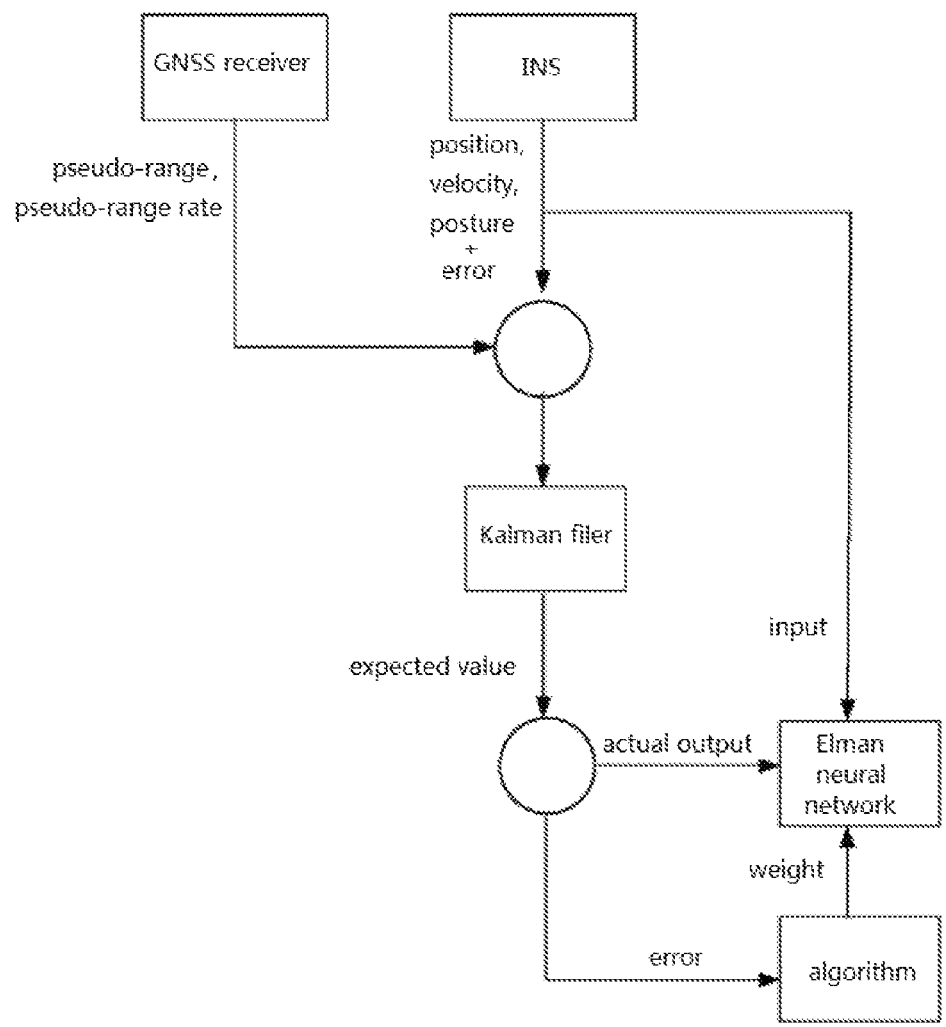
FIG. 5 is a schematic view of training Elman neural network.

The status prediction estimation in the integrated navigation is corrected in real time according to the trained network, and when correcting, the status variable $\hat{x}_k$ of the EKF filter of the integrated system is replaced by the $\overline{X}_k$, The specific method is shown in FIG. 5.

When the GNSS signals are available, the neural network works in the training mode, and the three-dimensional position information output by the inertial navigation system is used as the input sample for training the network. The compensation value of the inertial navigation error output after the fusion of the Kalman filter is used as the expected output samples for the training the network. When the error between the actual output and the expected output is more than the predetermined threshold (10-2 is set to meet the navigation error requirements in the present disclosures), the weight information is updated by the network weight update algorithm in Step 2 until a set of optimal weights is obtained so that the error between the actual output of the network and the expected output is less than the predetermined threshold.

Figure 6:
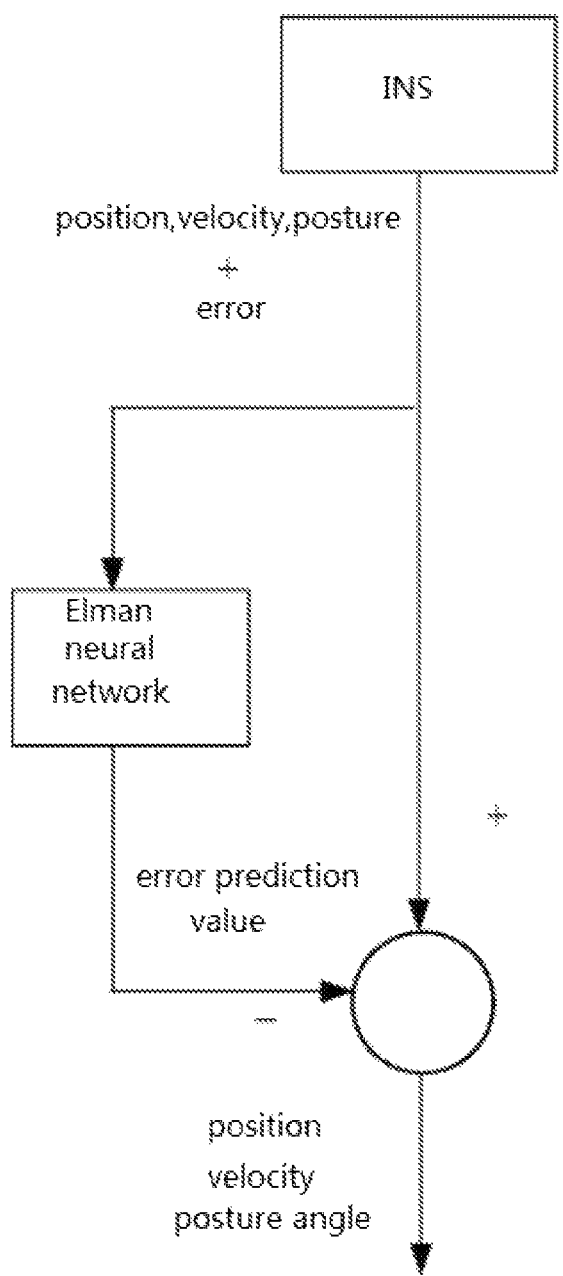
FIG. 6 is a schematic view of prediction process of Elman neural network.

The prediction process of the neural network is shown in FIG. 6. When the GNSS signals are blocked, the neural network will work in the prediction mode. Similarly, the navigation position information output by the inertial navigation system is used as the input of the network, and the error of the inertial navigation system is predicted by the trained neural network model, and is used to correct the navigation output of the inertial navigation to provide the corrected navigation information for the mobile carrier.

In order to verify the reliability of the algorithm in practical applications, an experiment was carried out. The practical application value of the algorithm is verified by analyzing the error of GNSS in the case of signal blocking and the error of integrated navigation under the machine learning of the present disclosure.

The embodiments of the present disclosure is described as follows:

In order to verify the effect of the random error suppression technology of the dual-axis rotating inertial navigation system based on external horizontal damping proposed in this disclosure, the GNSS module ublox6, the inertial navigation module HWT901 and the core board STM32F4 is chosen for completing the experiment.

The ublox6 receiver connects to the HWT901B module packaged by Viter Intelligence Corporation with a gyroscope, a magnetometer and an accelerometer, the data of the two modules are sent to STM32F4 through the serial port and finally sent to the computer for processing to ensure the time alignment of the two sensors. The specific indexes of the HWT901B module are shown in Table 1:

TABLE 1 the specific indexes table of the HWT901B module

| Title | gyroscope | accelerometer |
|---|---|---|
| Constant drift | ±3°/s | ±25 mg |
| Random Walk | 0.007°/s/$\sqrt{Hz}$ | 180 ug/$\sqrt{Hz}$ |

Figure 7:
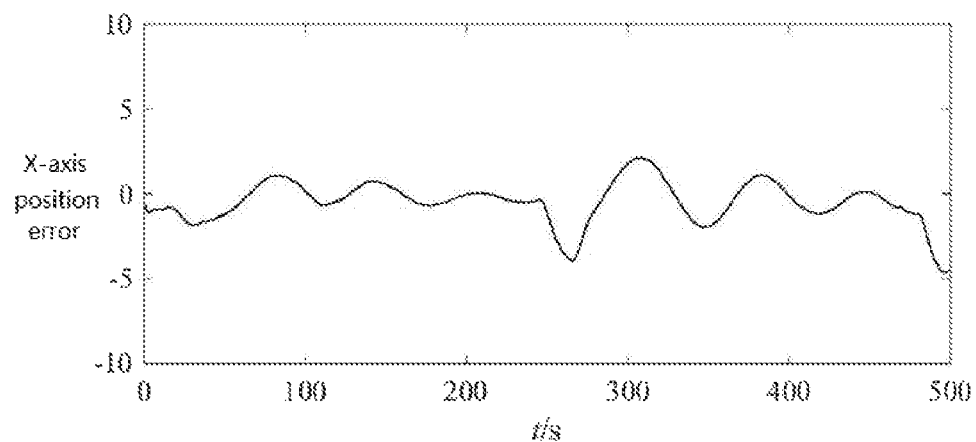
FIG. 7 is a graph of X-axis position error before GNSS signals are blocked.
Figure 8:
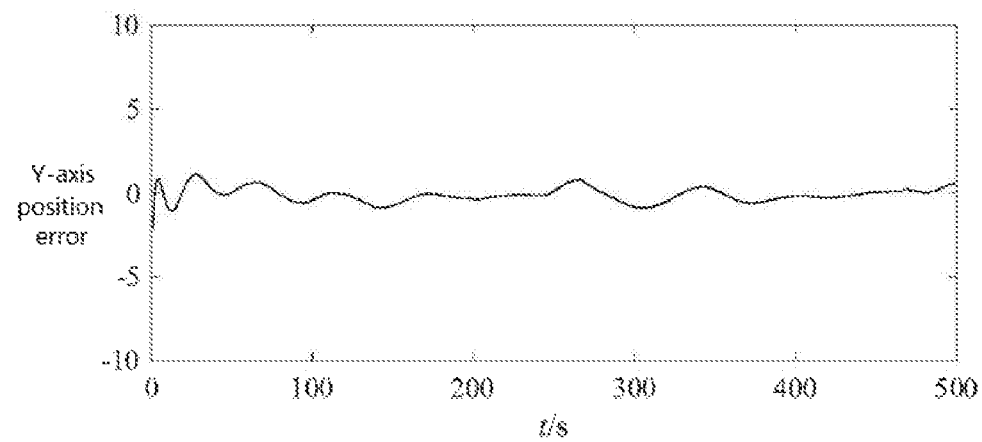
FIG. 8 is a graph of Y-axis position error before GNSS signals are blocked.
Figure 9:
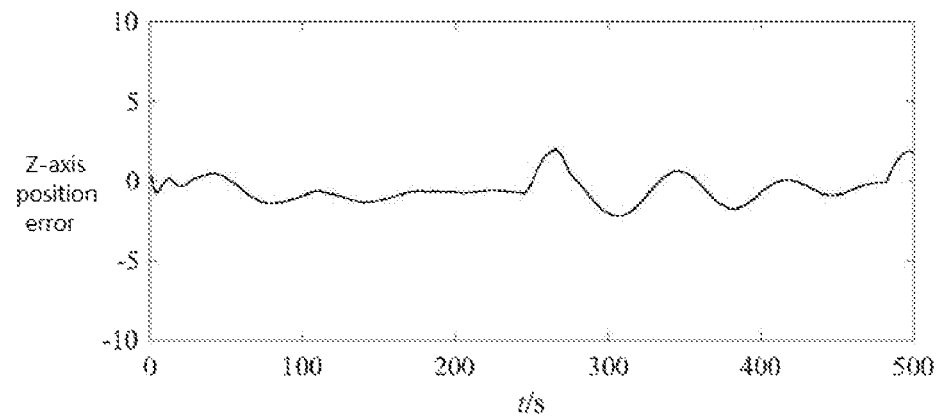
FIG. 9 is a graph of Z-axis position error before GNSS signals are blocked.

A total of 500 s data is collected for the experiment, and 100 s data after shielding is collected for the experiment so as to simulate the signal blocking situation, the position error before blocking is shown in FIGS. 7-9.

Figure 10:
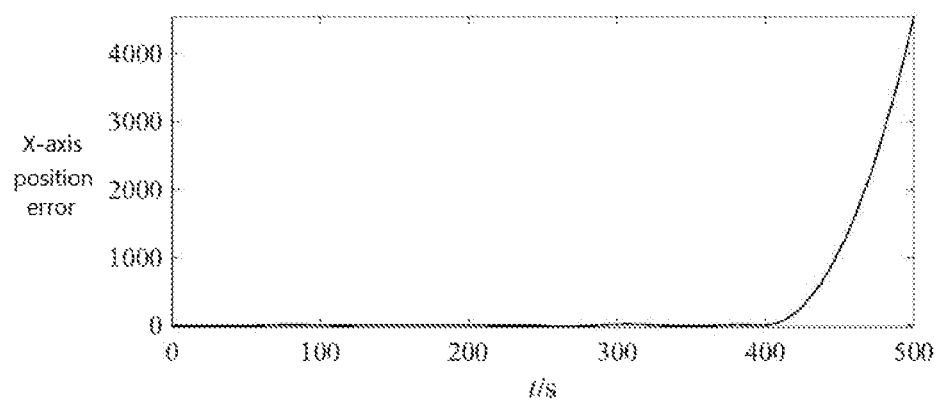
FIG. 10 is a graph of X-axis position error after GNSS signals are blocked.
Figure 11:
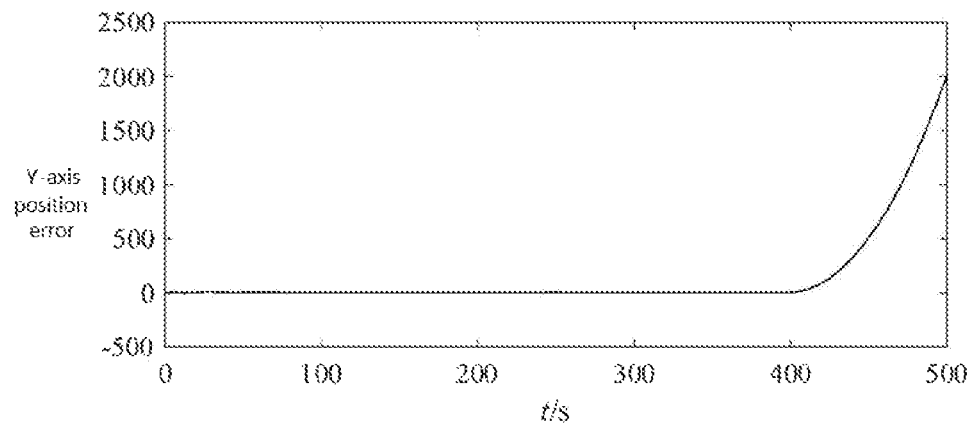
FIG. 11 is a graph of Y-axis position error after GNSS signals are blocked.
Figure 12:
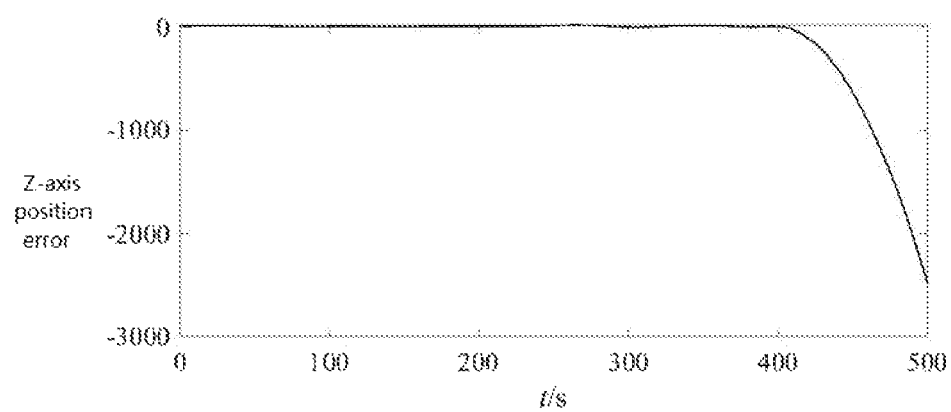
FIG. 12 is a graph of Z-axis position error after GNSS signals are blocked.

The error after blocking is shown in FIGS. 10-12.

Figure 13:
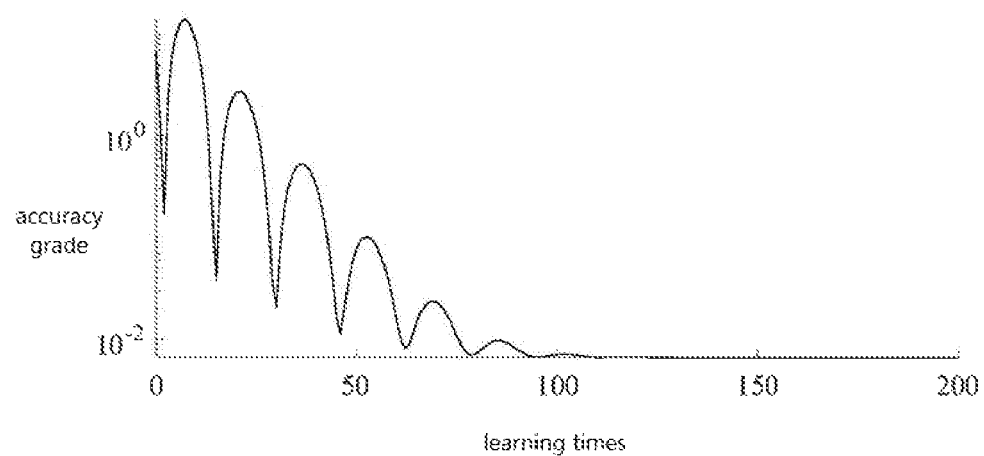
FIG. 13 is a graph of accuracy with respect to Elman learning times.

It can be found that the satellite signal is blocked at 400 s from the figure, the device itself has low accuracy because the inertial navigation device is low-cost, and thus, the navigation system that only relies on the inertial navigation disperses rapidly, and the system is completely unable to positioning due to the increased error. As a contrast, the results obtained by the Elman neural network algorithm are shown in FIG. 13.

Figure 14:
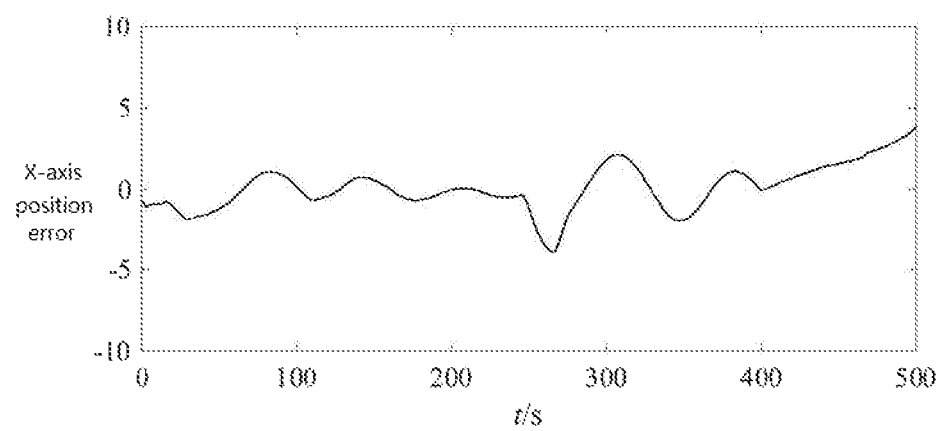
FIG. 14 is a graph of the X-axis position error predicted by the Elman neural network after GNSS signals are blocked.
Figure 15:
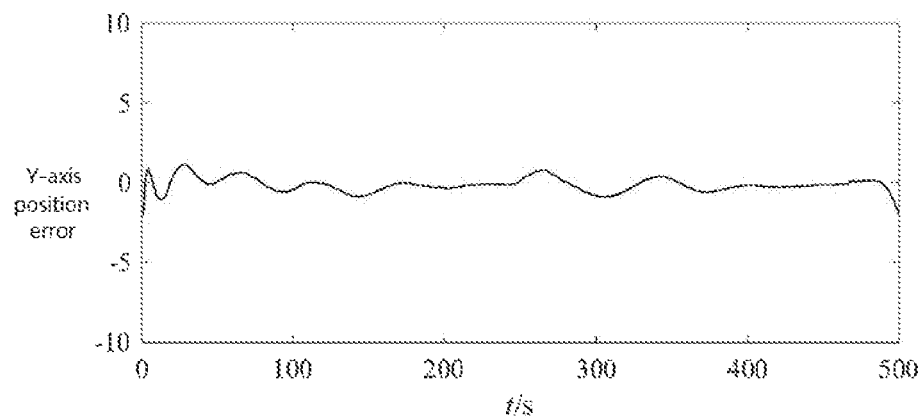
FIG. 15 is a graph of the Y-axis position error predicted by the Elman neural network after GNSS signals are blocked.
Figure 16:
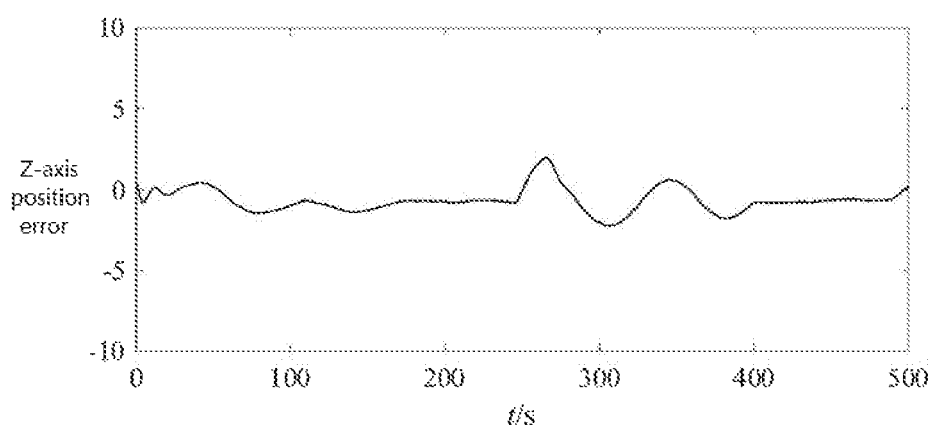
FIG. 16 is a graph of the Z-axis position error predicted by the Elman neural network after GNSS signals are blocked.

It can be found that the accuracy has reached 10-2 which can fully meet the prediction needs when the number of learning reaches 100 times. The learning times and the reached accuracy may be variable in the learning algorithm in the present disclosures. Even if the training times is reduced, such as 50 times, and the accuracy can reach 10-1. When the output errors of all samples meet the allowable range, the network training ends. And the trained neural network may be used to make predictions. The predicted position error results are shown in FIGS. 14-16.

It can be found that the position error of the three directions based on Elman prediction is close to the previous time when the GNSS signals are blocked. Although there is some divergence as time goes by, the position error corrected by the error prediction is still acceptable. That is, the inertial navigation information compensated by Elman does not diverge rapidly like the situation shown in the FIG. 11-13, and the navigation accuracy of the ship can be met by the algorithm in the present disclosure.

The present disclosure further provide an Elman neural network assisting tight-integrated navigation system, comprising: a GNSS receiver for receiving GNSS signals, an INS receiver for receiving INS signals, a Kalman filter for executing a filtering process of received signals, and a processor operable to establish an Elman neural network model and selecting a hidden layer transfer function of the Elman neural network, design an Elman learning algorithm, and establish a tight-integrated Kalman filter mathematical model.

When the GNSS signals are available, the Elman neural network works in a training mode, a three-dimensional position information outputted by the INS receiver is used as input samples for training the Elman neural network designed by the processor; a compensation value of an inertial navigation error output after a fusion of the Kalman filter is used as expected output samples for training the Elman neural network, and the input samples and the expected output samples are brought into the Elman neural network established for training the Elman neural network; when errors between actual outputs of the Elman neural network and the expected output samples are more than a predetermined threshold, an updated value of a network weight is obtained by cyclically using the Elman neural network until the errors between the actual outputs of the Elman neural and the expected outputs are less than the predetermined threshold, and when the GNSS signals are blocked, the Elman neural network works in a prediction mode; a navigation position information output by the INS receiver is used as the input of the trained neural network, an error of the inertial navigation system is predicted by the trained neural network, and a corrected navigation information is obtained by correcting the navigation output of the INS receiver by the error predicted by the Elman neural network.

The Elman neural network assisting tight-integrated navigation system will be described with reference to FIG. 17, which depicts an exemplary system.

Figure 17:
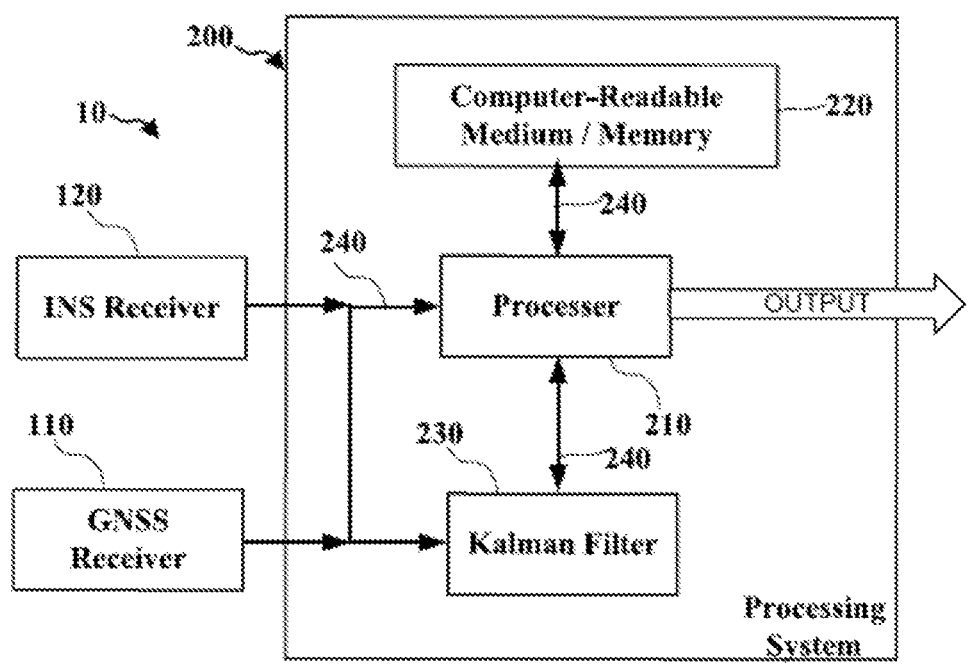
FIG. 17 is the Elman neural network assisting tight-integrated navigation system.

As shown in FIG. 17, the system 10 may include the GNSS receiver 110, INS receiver 120 and the processing system 200.

Referring to FIGS. 5 and 17, the GNSS receiver 110 may receive the GNSS signals, and provide the pseudo-range and the pseudo-range rate to the processing system 200. The INS receiver 120 may receive the INS signals and provide the position information, velocity information, posture information and the error to the processing system 200.

The processing system 200 may include the processor 210, the Computer-Readable Medium/Memory 220 and the Kalman filer 230. In one example embodiment, the Kalman processor 230 may be implemented as a software executable by the processor 210.

The apparatus may include additional components that perform the algorithm of the present disclosure. Each step of the algorithm may be performed by a component and the apparatus may include one or more of those components. The components may be one or more hardware components specifically configured to carry out the processes/algorithm, implemented by a processor configured to perform the stated processes/algorithm, stored within a computer-readable medium 220 for implementation by a processor, or some combination thereof.

The processing system 200 may be implemented with a bus architecture, represented generally by the bus 240. The bus 240 may include any number of interconnecting buses and bridges depending on the specific application of the processing system 200 and the overall design constraints. The bus 200 links together various circuits including one or more processors and/or hardware components, represented by the processor 210, the Computer-Readable Medium/Memory 220 and the Kalman filer 230. The bus 200 may also link various other circuits such as timing sources, peripherals, voltage regulators, and power management circuits, which are well known in the art, and therefore, will not be described any further.

The processing system 200 may be coupled to the GNSS receiver 110 and the INS receiver 120. The GNSS receiver 110 and the INS receiver 120 are coupled to one or more antennas. The GNSS receiver 110 and the INS receiver 120 provide a means for communicating with various other apparatus over a transmission medium. The GNSS receiver 110 and the INS receiver 120 receive signals from the one or more antennas, extracts information from the received signal, and provides the extracted information to the processing system 200, specifically the processor 210 and the Kalman filer 230. The processing system 200 includes a processor 210 coupled to a computer-readable medium/memory 220. The processor 210 is responsible for general processing, including the execution of software stored on the computer-readable medium/memory 210. The software, when executed by the processor 210, causes the processing system 200 to perform the various functions described supra for any particular apparatus. The computer-readable medium/memory 220 may also be used for storing data that is manipulated by the processor 210 when executing software.

While certain embodiments have been described, it will be understood that various modifications can be made without departing from the scope of the present disclosure. Thus, it will be apparent to those of ordinary skill in the art that the present disclosure is not limited to any of the embodiments described herein, but rather has a coverage defined only by the appended claims and their equivalents.

What is claimed is:
1. An Elman neural network assisting tight-integrated navigation method without Global navigation satellite system (GNSS) signals of an integrated navigation system, comprising:

step 1: establishing an Elman neural network and selecting a hidden layer transfer function of the Elman neural network,
step 2: designing an Elman learning algorithm,
step 3: establishing a tight-integrated Kalman filter and detecting an availability of the GNSS signals,
step 4: in response to detecting the availability of the GNSS signals, navigating a ship using the GNSS signals and causing a neural network to work in a training mode, wherein a three-dimensional position information output by a receiver of an inertial navigation system is used as input samples for training the neural network designed in the step 2 by a processor; a compensation value of an inertial navigation error output after a fusion of the Kalman filter established in step 3 is used as expected output samples for training the network, and the input samples and the expected output samples are brought into the Elman neural network established in the step 2 for training the Elman neural network;
when errors between actual outputs of the Elman neural network and the expected output samples are more than a predetermined threshold, an updated value of a network weight is obtained by cyclically using the Elman neural network algorithm designed in step 2 until the errors between the actual outputs of the network and the expected outputs are less than the predetermined threshold, and
step 5: in response to detecting that the GNSS signals are blocked, causing the neural network to work in a prediction mode; a navigation position information output by the inertial navigation system is used as the input of the network trained by the step 4, an error of the inertial navigation system is predicted by the neural network trained by the step 4, and a corrected navigation information is obtained by correcting the navigation output of the inertial navigation system by the error predicted by the neural network; wherein the navigation output of the inertial navigation system is corrected and compensated by the predicted data, thus the integrated navigation system is configured to continue to provide navigation data when the GNSS signals are momentarily unavailable; and
navigating the ship using the corrected and compensated output to the integrated navigation system of a ship to meet navigation accuracy requirements of the ship;
wherein, the Elman neural network comprises an input layer, a hidden layer, a connection layer and an output layer, a mathematical model of the Elman neural network is expressed as follows:

$$x_h(k)=f(W_1P(k)+W_3x(k));$$

$$x_c(k)=\alpha x_h(k-1);$$

$$y(k)=g(W_2x(k));$$

wherein, P(k) represents an input vector of the Elman neural network at time k, $x_n(k)$ represents an output vector of the hidden layer neuron at time k, x(k) represents an input vector of the Elman neural network derived from the output of the hidden layer at time k, $x_c(k)$ represents an output vector of the connection layer at time k, y(k) represents the output vector of the entire network output layer at time k, $W_1$, $W_2$ and $W_3$ are respectively connection weight matrixes between the input layer and the hidden layer, between the hidden layer and the output layer, and between the connection layer and the hidden layer, f(•) and g(•) are respectively transfer functions of the hidden layer and the output layer, and a is a connection feedback gain factor; and wherein the inertial navigation system comprises a gyroscope and an accelerometer.

2. The method as claimed in claim 1, wherein, an S-tangent function is selected as the transfer function of the hidden layer of Elman neural network.

3. The method as claimed in claim 1, wherein, the step 2 comprises, a calculation process of the Elman neural network is divided to comprise a forward propagation of a working signal and a backward propagation of the error;

the calculation of the forward propagation of the working signal is in consistent with the mathematical model of the Elman neural network, and the signal y(k) of the network output is calculated;

the back propagation of the error is as follows: that the actual output of the network is y(k) at time k is assumed, and the expected output response of the network is $y_d(k)$, then the error of the network is as follows:

$$E_k = \frac{1}{2}(y_d(k)-y(k))^2$$

partial derivatives of the error function with respect to the connection weights between different layers are obtained, respectively; the partial derivative of the error function $E_k$ with respect to the connection weight matrix $W_2$ from the hidden layer to the output layer is obtained as follows:

$$\frac{\partial E}{\partial w_{ij}^2} = -(y_{d,i}(k)-y(k))\frac{\partial y_i(k)}{\partial w_{ij}^2} = -(y_{d,i}(k)-y(k))g(\bullet)x_j(k)$$

wherein, i represents an i-th hidden layer neuron, which is the i-th row of the weight matrix $W_2$, and j represents a j-th output layer neuron, which is the j-th column of the weight matrix $W_2$;

assuming $\delta_i^0 = (y_{d,i}(k)-y(k))g(\bullet)$, then:

$$\frac{\partial E}{\partial w_{ij}^2} = -\delta_i^0 x_j(k)$$

the partial derivative of Ek with respect to the connection weight matrix $W_1$ from the input layer to the hidden layer is obtained as follows:

$$\frac{\partial E}{\partial w_{ij}^1} = \frac{\partial E}{\partial x_j(k)}\frac{\partial x_j(k)}{\partial w_{ij}^1} = \sum\left(-\delta_i^0 w_{ij}^2\right)f_j'(\bullet)P(k-1)$$

assuming $$\delta_j^h = \sum_{i=1}^{m}\left(-\delta_i^0 w_{ij}^2\right)f_j'(\bullet),$$

then:

$$\frac{\partial E}{\partial w_{ij}^1} = -\delta_i^h P(k-1)$$

the partial derivative of Ek with respect to the connection weight matrix $W_3$ from the connection layer to the hidden layer is obtained as follows:

$$\frac{\partial E}{\partial w_{ij}^3} = \sum\left(-\delta_i^0 w_{ij}^2\right)\frac{\partial x_j(k)}{\partial w_{ij}^3} = f_j' x_{c,i}(k) = f_j'(\bullet)x_i(k-1) + \alpha f_j'(\bullet)x_{c,i}(k)$$

wherein, l is the l-th neuron of the connection layer; using $$\Delta w = -\frac{\partial E}{\partial w},$$

updated values for each weight may be obtained as follows:

$$\Delta w_{ij}^2 = \eta \delta_i^0 x_j(k)$$

$$\Delta w_j^1 = \eta \delta_i P(k-1)$$

$$\Delta w_{ij}^3 = \eta \sum \left(\delta_i^0 w_{ij}^2\right)\frac{\partial x_j(k)}{\partial w_{jl}^3}\delta_i^0 x_j(k)$$

wherein, $$\delta_i^0 = (y_{d,i}(k)-y(k))g_i(\bullet)$$

$$\delta_j^h = \Sigma(\delta_i^0 w_{ij}^2)f_j'(\bullet)$$

4. The method as claimed in claim 1, wherein, the step 3 comprises, 15-dimensional system state variables selected are as follows:

$$X = [\delta pos\, \delta V\, \delta\varphi\, \varepsilon\, \nabla\, b_{clk}\, d_{clk}]$$

wherein, δpos is three position errors of the ECEF coordinate system, δV is a velocity error in the ENU coordinate system, δ is three posture errors of the inertial navigation system, ε is three posture angle errors, ∇ is acceleration zero-biases in three directions, $b_{clk}$ is a clock error, and $d_{clk}$ is a clock drift;

an external observation is obtained by the difference Z between the pseudo-range information and pseudo-range rate information obtained by the inertial navigation system and the measurement information of the pseudo-range and pseudo-range rate of each GNSS satellite, a system measurement equation is as follows:

$$Z = \begin{bmatrix} Z_\rho \\ Z_{\dot\rho} \end{bmatrix} = HX + V$$

wherein, H is an observation matrix, V is an observation noise, ρ is a pseudo-range, and $\dot\rho$ is a pseudo-range rate; a filtering calculation is performed by the EKF for the integrated navigation, the detailed filtering calculation is as follows:

one-step prediction status:

$$X_{k,k-1} = \varphi_{k,k-1} X_{k-1}$$

a status estimation:

$$X_k = X_{k,k-1} + K_k[Z_k - h_k(X_{k,k-1})]$$

a one-step prediction error variance matrix:

$$P_{k,k-1}=\varphi_{k,k-1}P_{k-1}\varphi_{k,k-1}{}^T+Q_{k-1}$$

a filter gain matrix:

$$K_k=P_{k,k-1}H_k{}^T(H_KP_{k,k-1}H_k{}^T+R_K)^{-1}$$

an estimation error variance matrix:

$$P_k=(I-K_kH_K)P_{k,k-1}$$

wherein, φ is an error status transfer matrix, K is a Kalman gain matrix, P is an error covariance matrix, and R is a noise covariance matrix;

the corrected position information X in three directions is calculated by the aforementioned Kalman filter, and the difference between the positions before and after the correction is brought into the established Elman neural network as an output of neural network during the neural network training.

5. The method as claimed in claim 1, wherein, the step 4 comprises, during network training, the number of input neurons and output neurons of the network is the number of position parameters in three directions in the ECEF coordinate system, m is 3;

the number I of neurons in the hidden layer is 3;

the input of the network is the position information $\hat{x}_k$ output by the inertial navigation of the integrated navigation system, the target output of the network is the compensation inertial navigation position ΔE after filtering of the integrated system;

the input samples and output samples are brought into the y(k) and yd (k) of the Elman neural network established in the step 2 to train the neural network, and the output $\hat{x}_k$ corrected by neural network is obtained after the training is completed, wherein, $\Delta E=\overline{X}_k-\hat{X}_k$ the data of ΔE are saved in the Elman neural network, and the error of the inertial navigation is corrected by retrieving the error data ΔE at the corresponding sampling time;

the position $\overline{x}_k$ in the three directions in the ECEF coordinate system is compensated in order to make a prediction, $$\overline{X}_k=\hat{X}_k+\Delta E$$

the status prediction estimation in the integrated navigation is corrected in real time according to the trained network, and when correcting, the status variable $\hat{X}_k$ of the EKF filter of the integrated system is replaced by the $\overline{X}_k$.

6. An Elman neural network assisting tight-integrated navigation system, comprising:

a Global navigation satellite system (GNSS) receiver configured to receive GNSS signals, an inertial navigation system (INS) receiver configured to receive INS signals, a Kalman filter configured to execute a filtering process of received signals, and a processor configured to: establish an Elman neural network and select a hidden layer transfer function of the Elman neural network, design an Elman learning algorithm, and establish the Kalman filter, wherein, when the GNSS signals are available, navigate a ship using the GNSS signals, and the Elman neural network works in a training mode, a three-dimensional position information outputted by the INS receiver is used as input samples for training the Elman neural network designed by the processor; a compensation value of an inertial navigation error output after a fusion of the Kalman filter is used as expected output samples for training the Elman neural network, and the input samples and the expected output samples are brought into the Elman neural network established for training the Elman neural network; when errors between actual outputs of the Elman neural network and the expected output samples are more than a predetermined threshold, an updated value of a network weight is obtained by cyclically using the Elman neural network until the errors between the actual outputs of the Elman neural and the expected outputs are less than the predetermined threshold, and when the GNSS signals are blocked, the Elman neural network works in a prediction mode; a navigation position information output by the INS receiver is used as the input of the trained neural network, an error of the inertial navigation system is predicted by the trained neural network, and a corrected navigation information is obtained by correcting the navigation output of the INS receiver by the error predicted by the Elman neural network; wherein the navigation output of the inertial navigation system is corrected and compensated by the predicted data, thus the integrated navigation system is configured to continue to provide navigation data when the GNSS signals are momentarily unavailable; and navigate the ship using the corrected and compensated output to the integrated navigation system of a ship to meet navigation accuracy requirements of the ship;

wherein, the Elman neural network comprises an input layer, a hidden layer, a connection layer and an output layer, a mathematical model of the Elman neural network is expressed as follows:

$$xh(k)=f(W1P(k)+W3x(k));$$

$$xc(k)=\alpha xh(k-1);$$

$$y(k)=g(W2x(k));$$

wherein, P(k) represents an input vector of the Elman neural network at time k, xn(k) represents an output vector of the hidden layer neuron at time k, x(k) represents an input vector of the Elman neural network derived from the output of the hidden layer at time k, xc(k) represents an output vector of the connection layer at time k, y(k) represents the output vector of the entire network output layer at time k, $W_1$, $W_2$ and $W_3$ are respectively connection weight matrixes between the input layer and the hidden layer, between the hidden layer and the output layer, and between the connection layer and the hidden layer, f(•) and g(•) are respectively transfer functions of the hidden layer and the output layer, and α is a connection feedback gain factor; and wherein the inertial navigation system comprises a gyroscope and an accelerometer.

* * * * *